US007503721B2

(12) United States Patent
Kuratomi

(10) Patent No.: US 7,503,721 B2
(45) Date of Patent: Mar. 17, 2009

(54) COUPLING MECHANISM AND IMAGE DISPLAY DEVICE WITH THE SAME

(75) Inventor: Seiichiro Kuratomi, Fuchu (JP)

(73) Assignee: Toshiba Transport Engineering Inc., Tokyo (JP)

( * ) Notice: Subject to any disclaimer, the term of this patent is extended or adjusted under 35 U.S.C. 154(b) by 606 days.

(21) Appl. No.: 11/248,155

(22) Filed: Oct. 13, 2005

(65) Prior Publication Data

US 2006/0089044 A1 Apr. 27, 2006

(30) Foreign Application Priority Data

Oct. 14, 2004 (JP) ........................... P2004-300601

(51) Int. Cl.
*B25G 3/18* (2006.01)
*F16B 21/00* (2006.01)
*F16D 1/00* (2006.01)

(52) U.S. Cl. .................................... 403/322.2; 312/111

(58) Field of Classification Search ............. 403/322.2; 312/111; 439/353; 285/311-312
See application file for complete search history.

(56) References Cited

U.S. PATENT DOCUMENTS

| | | | | |
|---|---|---|---|---|
| 3,186,745 | A * | 6/1965 | Lyles | 403/2 |
| 4,453,449 | A * | 6/1984 | Hollmann | 89/1.806 |
| 5,653,416 | A | 8/1997 | Frank | |
| 5,995,179 | A | 11/1999 | Tamura et al. | |
| 6,619,875 | B2 * | 9/2003 | Chiang | 403/322.2 |
| 6,926,375 | B2 * | 8/2005 | Nagamine et al. | 312/111 |

FOREIGN PATENT DOCUMENTS

| | | | |
|---|---|---|---|
| DE | 40 25 385 | A1 | 2/1992 |
| DE | 94 02 368.9 | | 6/1994 |
| EP | 1 365 376 | A1 | 11/2003 |
| EP | 1647962 | A2 * | 4/2006 |
| JP | 2001-254885 | | 9/2001 |
| JP | 2003-348493 | | 12/2003 |
| JP | 2006138469 | A * | 6/2006 |

OTHER PUBLICATIONS

European Search Report issued by the European Patent Office on Oct. 23, 2007, for European Patent Application No. 05022467.4.

* cited by examiner

*Primary Examiner*—Hae Moon Hyeon
(74) *Attorney, Agent, or Firm*—Finnegan, Henderson, Farabow, Garrett & Dunner, L.L.P.

(57) ABSTRACT

A coupling mechanism includes column-shaped plugs having engagement grooves, cylindrical sockets movable to and from the plugs in the axial direction, slip-proof members which are engaged with the engagement grooves of the plugs to prevent the plugs from slipping out of the sockets and sliding cylinders slidably fitted to the outside of the sockets in the axial direction of the plugs to enable the slip-proof members to engage with the engagement grooves. In operation, first spring members always urge the sliding cylinders in a direction to engage the slip-proof members with the engagement grooves. When cams of cam mechanisms rotates, the sliding cylinders are moved in opposition to the urging of the first spring members, so that the connection between the display units is released.

8 Claims, 15 Drawing Sheets

COUPLING MECHANISM AND IMAGE DISPLAY DEVICE WITH THE SAME

BACKGROUND OF THE INVENTION

The present invention relates to a coupling mechanism which is suitable to interconnect a plurality of display units successively, the display unit each having a number of display elements. Additionally, the present invention relates to an image display device which is produced by connecting the above display units with each other at least in a vertical direction of the display units to display screen images.

As often come across, image display devices, each of which includes a number of display elements such as light emitting diode (LED) forming a display screen image, are installed in indoor/outdoor stadiums, various event sites, a billboard of a building facing a busy downtown street, etc.

These image display devices may be located in stadiums or building structures on a permanent basis. Alternatively, they may be assembled on a case-by-case basis at various event sites around the country or mounted on respective beds of heavy vehicles.

This kind of image display device is capable of full-color displaying with RGB (red-green-blue) lighting control, thereby promo-displaying, guidance-displaying for customers or displaying of television images for audiences. Generally, the image display device includes a plurality of display units that are connected with each other vertically and horizontally through coupling tools or connecting tools (Japanese Patent Application Laid-open No. 2003-348493).

FIG. 1 is a perspective view of the substantial part of a conventional image display device where the above display units are connected with each other. FIG. 2 is a perspective view of the substantial part of the image display device where the display units 1, 1 are connected with each other in a vertical direction, also viewed from the rear side.

In FIGS. 1 and 2, each of the display units 1 includes a plurality of display panels 11 [e.g. 12 (=3×4) panels in FIG. 1] and a box-shaped casing 12 equipped, on its front side, with the display panels 11. Each display panel 11 has a number of display elements 11*a* arranged in a matrix manner. Generally, the weight of one display unit 1 amounts to 30 kg in case of the display elements of LED.

In the casing 12, a joint pin 2 is arranged at the center of the top surface of the casing 12 to connect the display unit 1 with a not-shown mating display unit to be mounted thereon. On both sides of the joint pin 2, the casing 12 further includes two guide pins 121, 121 for guiding the connection between two casings 12 in vertical arrangement.

The joint pin 2 is equipped, at its upper part, with a penetrating engagement rod 2*a*, providing a T-shaped configuration. As shown in FIG. 2, the joint pin 2 is connected to an engagement part 3 attached to a lower part of the mating display unit 1 to be mounted on the display unit 1 having the joint pin 2.

In this way, the above-mentioned joint pin 2 and the engagement part 3 do constitute a conventional coupling tool (or coupling mechanism) used in connecting the display units 1, 1 with each other in the vertical direction to form the above image display device.

FIG. 3 is an enlarged perspective view of the substantial part of a coupling mechanism having the above conventional coupling tool. As mentioned above, the upper display unit (not shown) is provided, at its lower end, with the engagement part 3 having a pair of hooks 31. While, the lower display unit (not shown) is provided, at its upper end, with the joint pin 2 having the engagement rod 2*a*. In the course of connecting the lower display unit with the upper display unit, when tile hooks 31 of the engagement part 3 of the upper display unit trap the engagement rod 2*a* of the joint pin 2 of the lower display unit, a handle 32 linked to the hooks 31 is rotated upwardly. Then, the rotation of the handle 32 allows a stopper 33 to locks up a coupling between the upper and lower display units.

In the above-constructed coupling mechanism, the upper display unit can be disconnected from the lower display unit by first pushing down the stopper 33 and subsequently manipulating the handle 32.

Note, as shown in FIGS. 1 and 2, each display unit 1 is provided, on both side surfaces thereof, with two pairs of connecting tools 4 (41), 4 (42) forming hook joints. These connecting tools 4 are provided to connect the horizontally-adjoining display units 1, 1 with each other.

FIG. 4A is a front view of the substantial part of the conventional image display device. FIG. 4B is a plan view of the substantial part of the conventional image display device. The illustrated image display device is completed by horizontally and vertically coupling a plurality of display units 1, 1 to each other with the use of the above-mentioned coupling mechanisms and the above connecting tools 4, providing a large display screen.

As another example of the conventional art, there is also known a hose coupling allowing flexible tubes (e.g. hoses) to be connected/disconnected to and from each other through an operator's one-touch operation (see Japanese Patent Application Laid-open No. 2001-254885).

The above-mentioned conventional coupling mechanism is constructed so as to allow the display units to be connected/disconnected to and from each other by an operator's manipulation of the handle. In order to accomplish the operator's proper manipulation of the handle, however, the above hooks 31 and the other coupling components have to be processed with high accuracy. Additionally, due to the structure using the T-shaped joint pin 2, the coupling mechanism has a complex structure formed by a number of components.

SUMMARY OF THE INVENTION

Under a situation as put forth above, the object of the present invention is to provide a coupling mechanism which is suitable to connect the display units with each other with a relatively-simple structure and an image display device adopting such a coupling mechanism, which allows the display units in vertical arrangement to be connected/disconnected to and from each other easily and appropriately.

In order to attain the objective, as the first aspect of the present invention, there is provided a coupling mechanism comprising: a column-shaped plug having an engagement groove formed on an outer circumference thereof; a cylindrical socket adapted so as to be movable to and from the plug in an axial direction thereof and formed so as to be engageable with the plug; at least one slip-proof member attached to the socket and formed so as to be engageable in the engagement groove of the plug; a sliding cylinder fitted around the socket so as to be slidable in the axial direction of the plug and formed so as to push the slip-proof member into the engagement groove of the plug; a first spring member for urging the sliding cylinder in a direction to push the slip-proof member into the engagement groove of the plug; and a cam mechanism equipped with a cam so that a rotation the cam allows the sliding cylinder to move in opposition to urging of the first spring member thereby canceling an engagement between the slip-proof member and the engagement groove.

In the second aspect of the invention, there is also provided an image display device comprising: at least two display units each having a number of display elements; and a coupling tool for connecting the display units with each other, the coupling tool including a coupling mechanism comprising a column-shaped plug having an engagement groove formed on an outer circumference thereof; a cylindrical socket adapted so as to be movable to and from the plug in an axial direction thereof and formed so as to be engageable with the plug; at least one slip-proof member attached to the socket and formed so as to be engageable in the engagement groove of the plug; a sliding cylinder fitted around the socket so as to be slidable in the axial direction of the plug an formed so as to push the slip-proof member into the engagement groove of the plug; a first spring member for urging the sliding cylinder in a direction to push the slip-proof member into the engagement groove of the plug; and a cam mechanism equipped with a cam so that a rotation of the cam allows the sliding cylinder to move in opposition to urging of the first spring member thereby canceling an engagement between the slip-proof member and the engagement groove.

According to the first aspect and the second aspect of the invention, each of the coupling mechanism and the image display device includes the plug having the engagement groove formed on the outer circumference, the sliding cylinder capable of pushing the slip-proof member of the socket into the engagement groove of the plug, the first spring member for urging the sliding cylinder to a direction to push the slip-proof member into the engagement groove of the plug and the cam mechanism equipped with the cam so that a rotation thereof allows the sliding cylinder to move in opposition to urging of the first spring member thereby canceling an engagement between the slip-proof member and the engagement groove. Therefore, due to the simple structure of the coupling mechanism, an operator can connect the socket with the plug through an operator's one-touch operation. Additionally, with an operator's manipulation to rotate the cam, it becomes possible to cancel the connection between the socket and the plug and also possible to establish a standby situation for the connection between the socket and the plug easily and appropriately.

These and other objects and features of the present invention will become more fully apparent from the following description and appended claims taken in conjunction with the accompany drawings.

DETAILED DESCRIPTION OF THE PREFERRED EMBODIMENT

Figure 1:
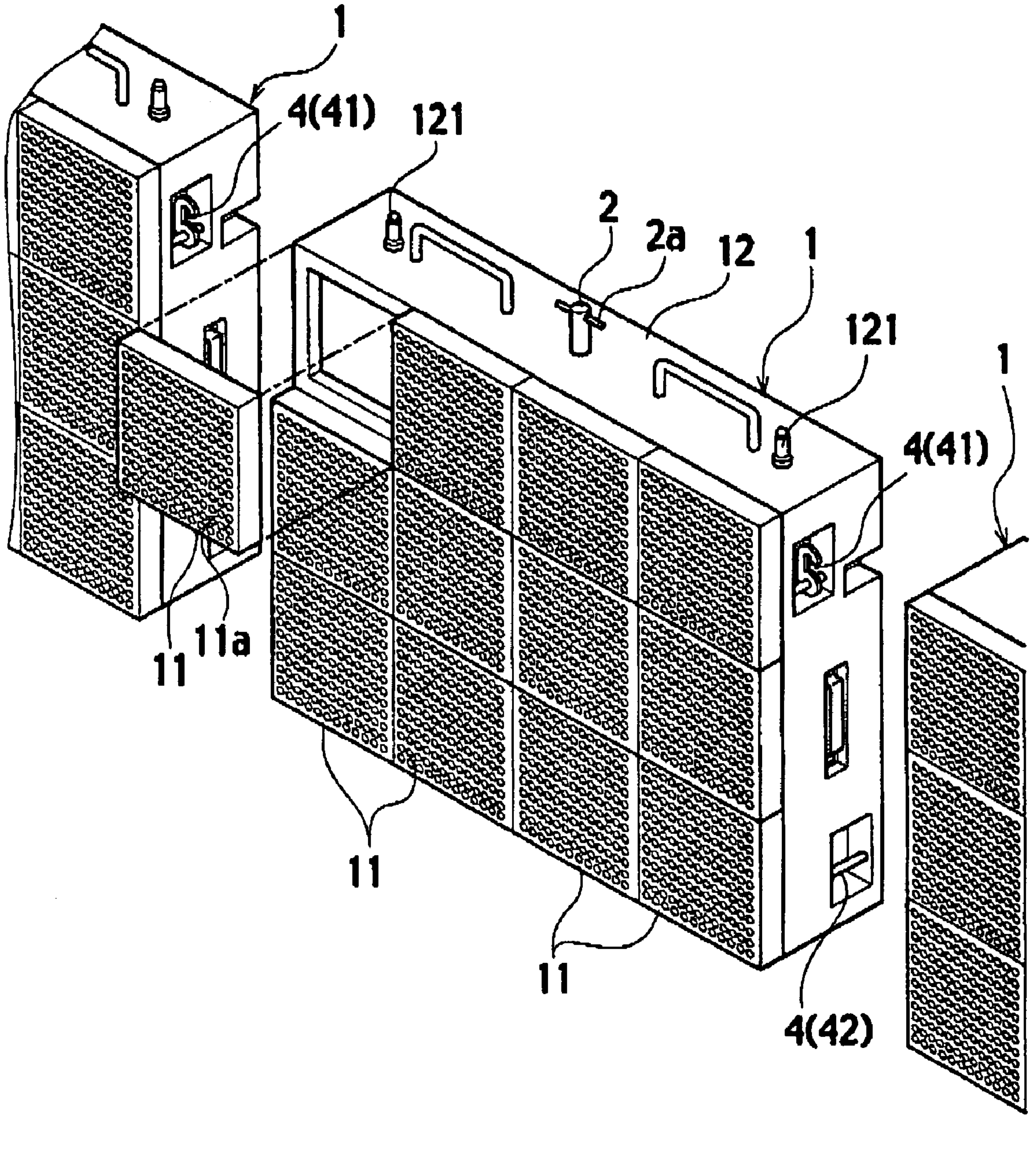
FIG. 1 PRIOR ART
FIG. 1 is a perspective view of the substantial part of a conventional image display device.
Figure 2:
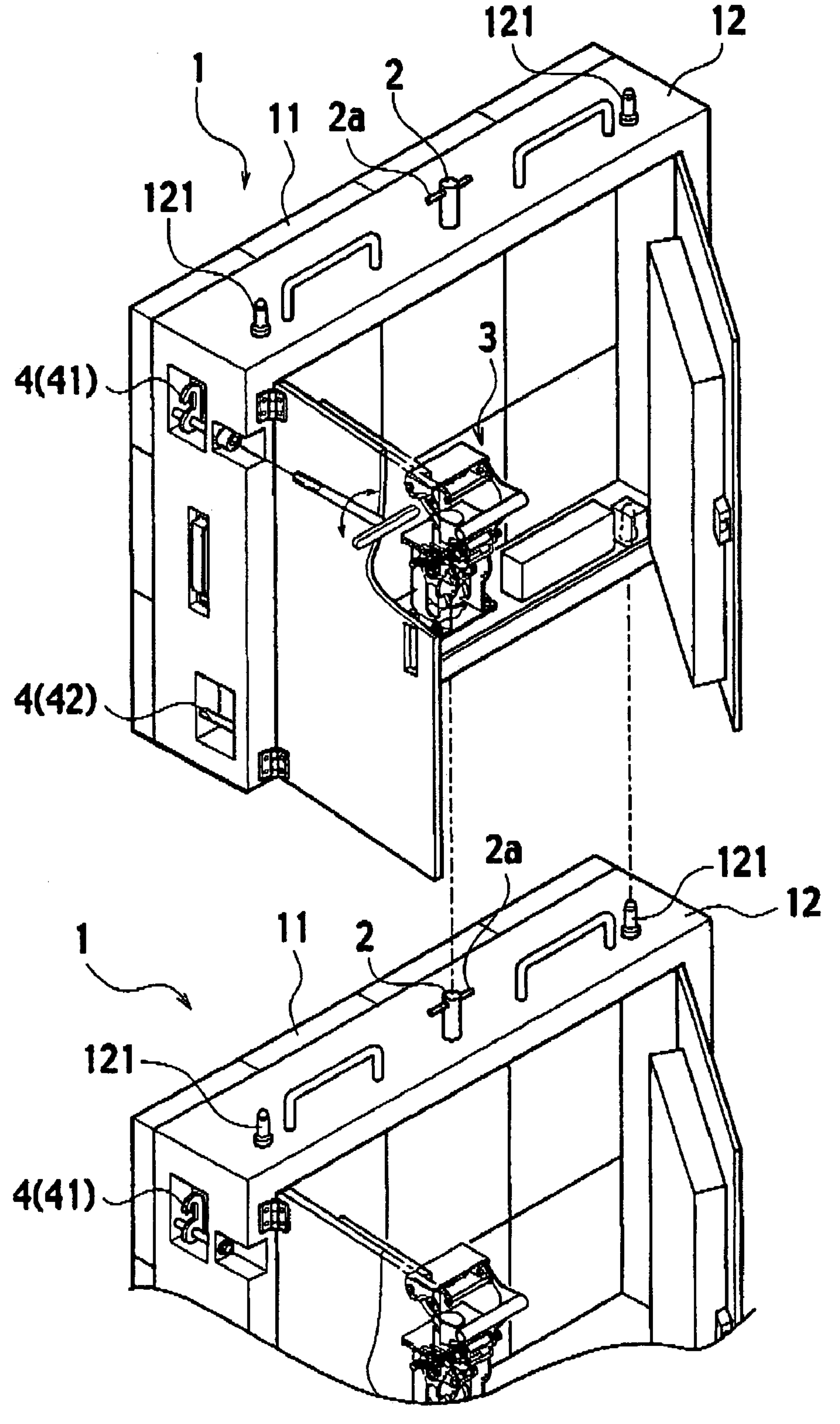
FIG. 2 PRIOR ART
FIG. 2 is a perspective view of the substantial part of a display unit in FIG. 1, viewed from its rear side.
Figure 3:
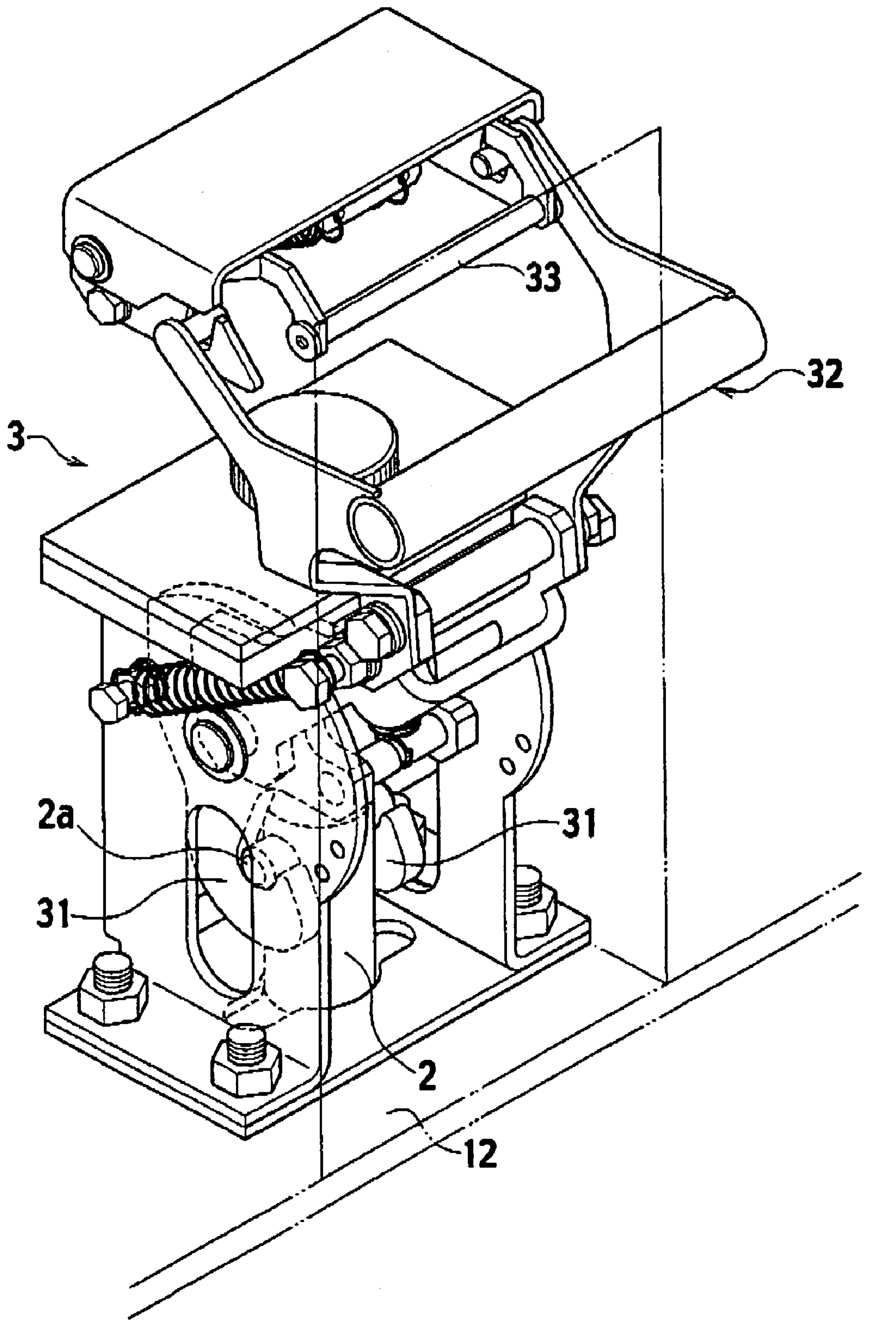
FIG. 3 PRIOR ART
FIG. 3 is an enlarged view of the substantial part of the display unit in FIG. 1.
Figure 4A:
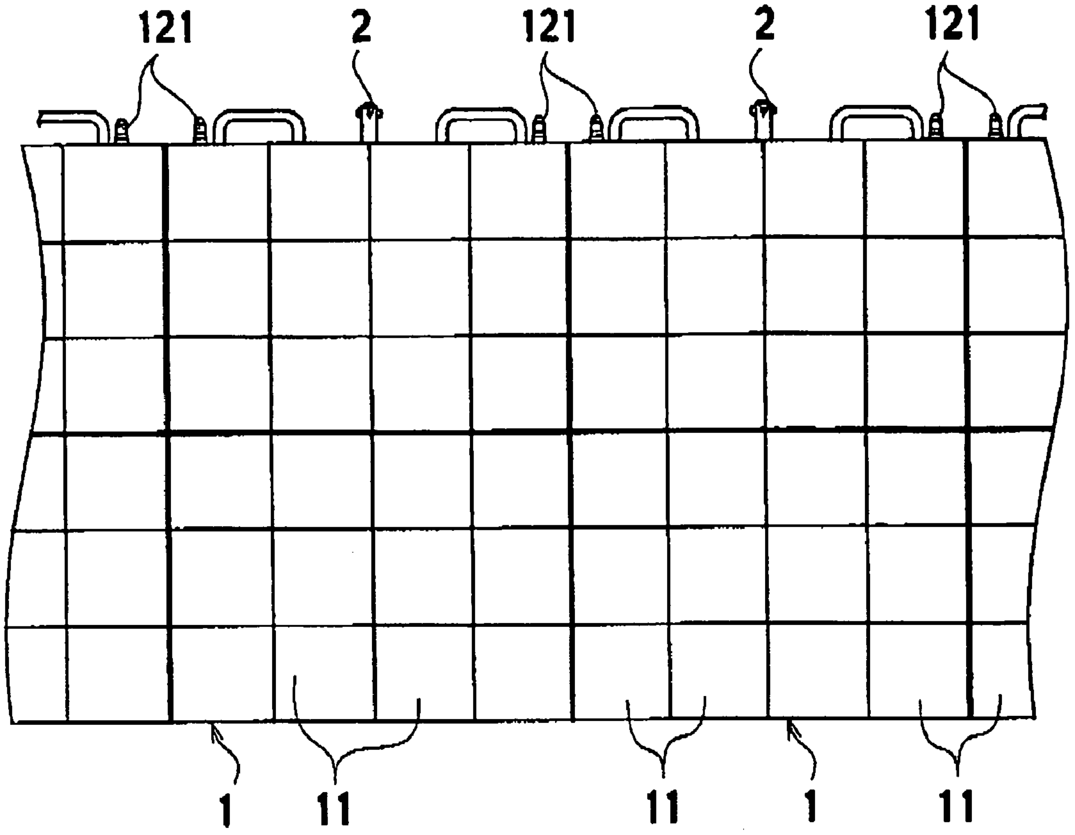
FIG. 4A PRIOR ART
FIG. 4A is a front view of the substantial part of the image display device and FIG. 4B is a plan view of the substantial part of the image display device.
Figure 4B:
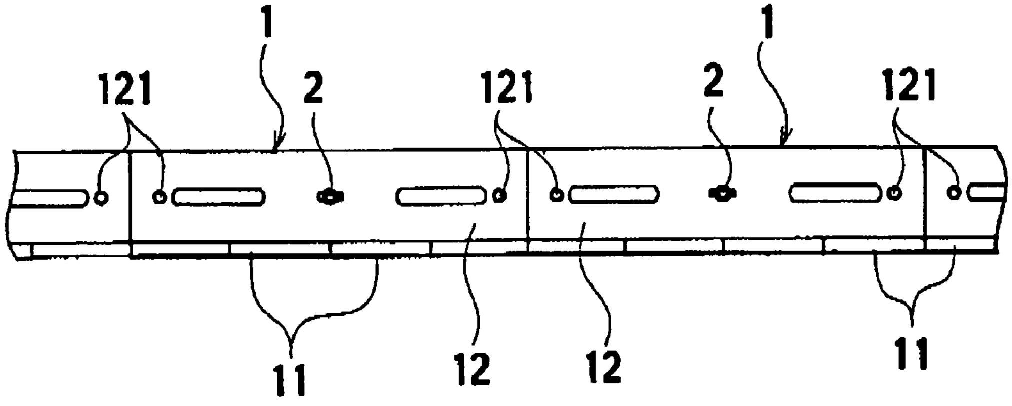
FIG. 4B PRIOR ART

Referring to FIGS. 5 to 17, an embodiment of an image display device adopting a connecting mechanism of the present invention will be described below. Note, elements identical to those in the conventional constitution shown in FIGS. 1 to 4B are indicated with the same reference numerals respectively and their detailed descriptions are eliminated.

Figure 5:
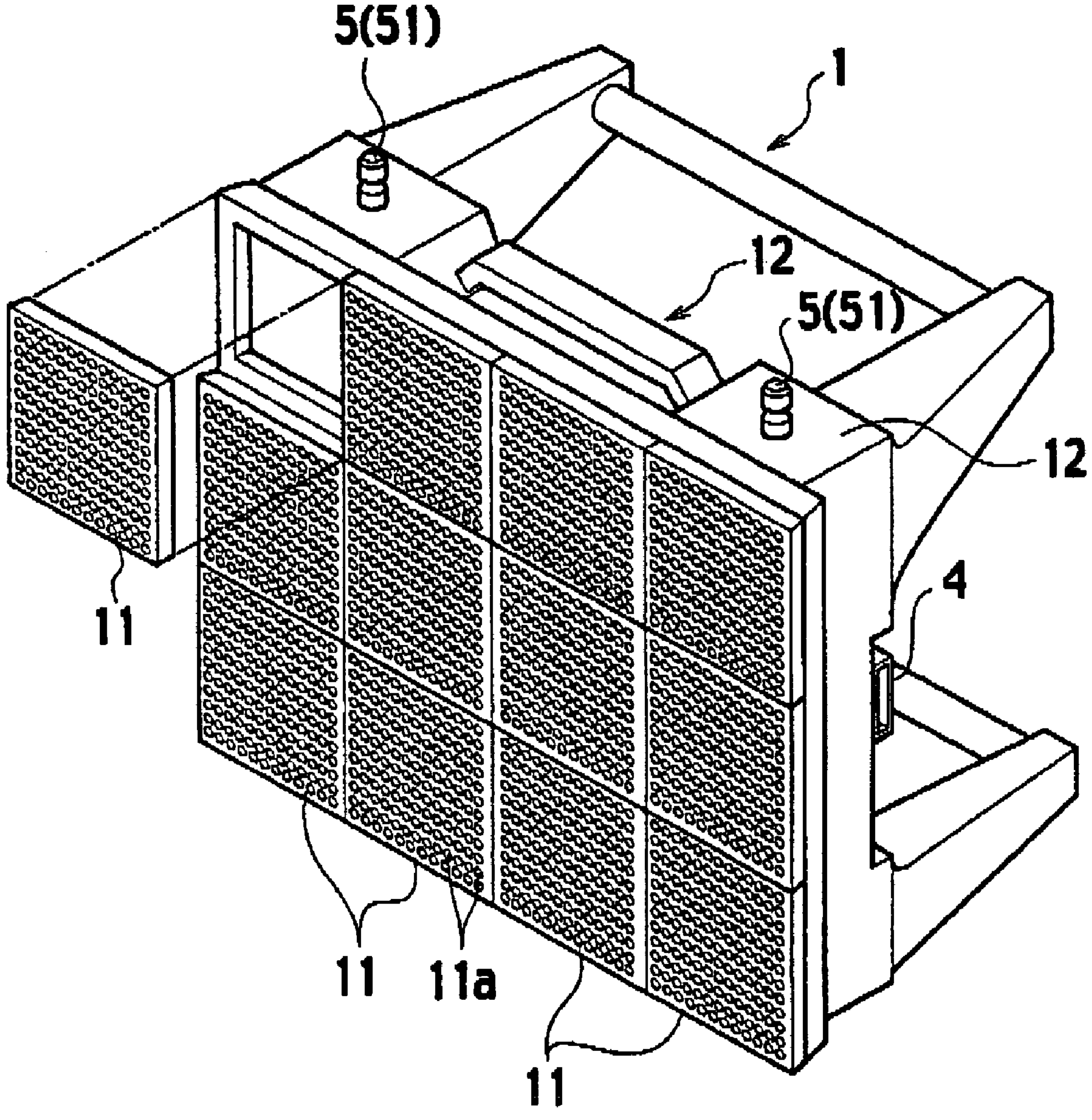
FIG. 5 is a perspective view of the substantial part of an image display device adopting a coupling mechanism in accordance with an embodiment of the present invention.
Figure 6:
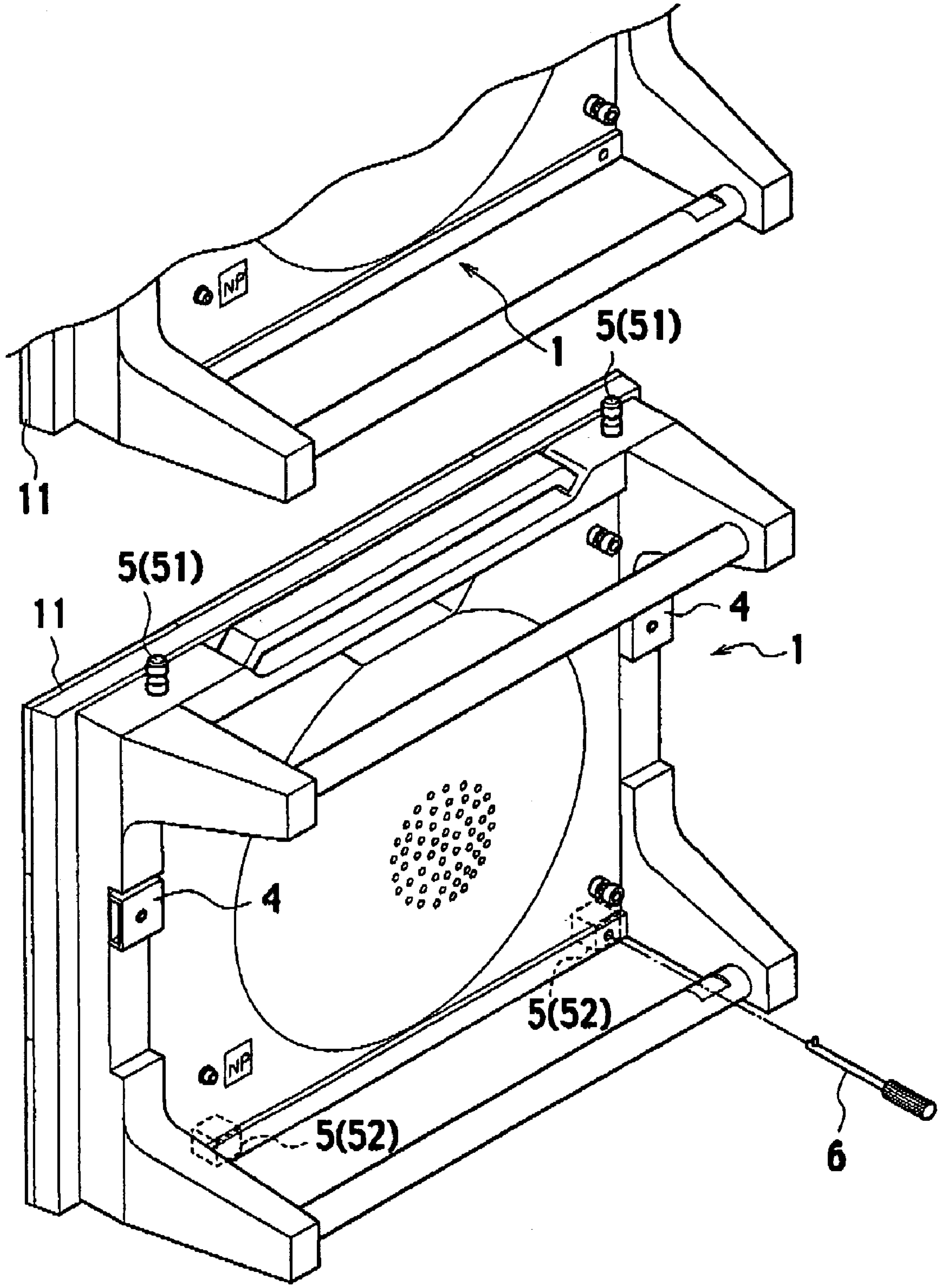
FIG. 6 is a perspective view of the substantial part of a display unit forming the image display device of FIG. 5, viewed from its rear side.

FIG. 5 is a perspective view of the substantial part of the image display device adopting the coupling mechanism in accordance with one embodiment of the present invention. FIG. 6 is a perspective view of a display unit forming the image display device, viewed from the rear side of the same unit.

As shown in FIGS. 5 and 6, the display unit 1 of the embodiment includes a scaffold-shaped casing 12 having four legs and a plurality of display panels 11 (twelve panels in the shown embodiment) assembled on the front surface of the casing 12. Each of the display panels 11 is provided with a number of display elements 11*a*, such as a light emitting diode (LED).

As usual, the image display device is composed of a plurality of display units 1, 1 connected with each other through coupling tools in the vertical direction and through connecting tools 4 in the horizontal direction. According to this embodiment, as the above coupling tools in the vertical direction, there is adopted a coupling mechanism consisting of column-shaped plugs projecting from the top of the display unit 1 and plug receiver assembled in the lower end of the display unit 1.

As already mentioned in the introductory part of the description, a hose coupling allowing flexible hoses to be connected/disconnected to and from each other through an operator's one-touch operation is known in this art. On the contrary, the coupling mechanism of this embodiment is nothing but a unique coupling mechanism that could be provided by installing a cam mechanism in such a hose coupling. In detail, if only manipulating to rotate a cam about its rotating axis, it becomes possible for an operator to connect/disconnect the upper display unit 1 to and from the lower display unit 1 appropriately.

In the display unit 1, as shown in FIGS. 5 and 6, the casing 12 is provided, on both ends of its upper part (upper surface), with column-shaped plugs 51, 51 forming a coupling mechanism 5 and also projecting in pairs.

The lower end of the display unit 1 is provided, at respective positions corresponding to the plugs 51, 51, with plug receivers 52, 52 to be detachably connected to the plugs 51, 51, which form the coupling mechanism 5 together therewith.

Figure 7:
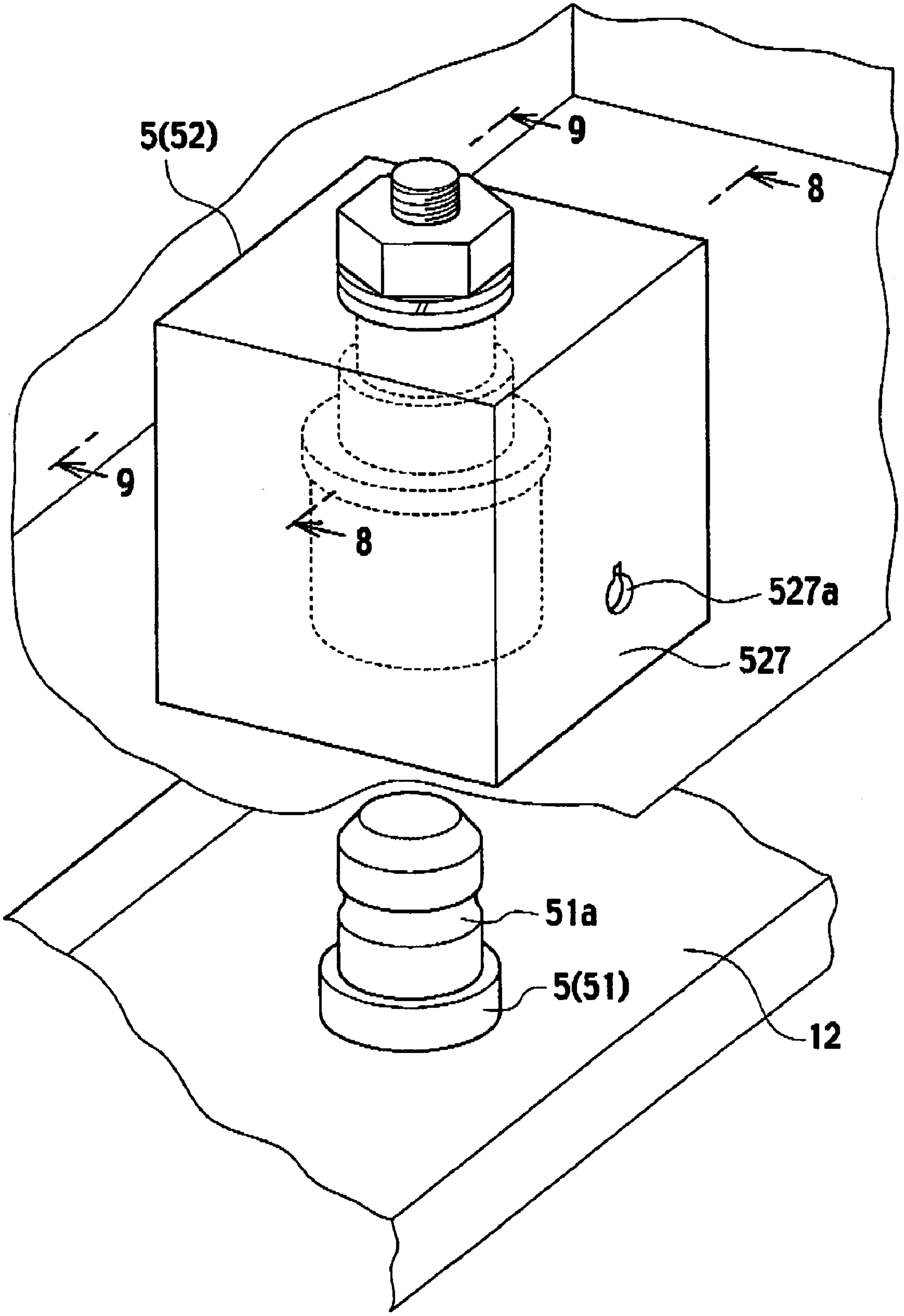
FIG. 7 is an enlarged perspective view showing a plug and a plug receiver of FIG. 5.

FIG. 7 is an enlarged perspective view showing the plug 51 at the upper end of the lower display unit 1 and the corresponding plug receiver 52 at the lower end of the upper display unit 1.

Here, functionally comparing the constitution of the coupling mechanism 5 of this embodiment with the constitution of the conventional hose coupling, the plug 51 and the plug receiver 52 of the coupling mechanism 5 corresponds to an entry and a socket of the hose coupling, respectively.

In the coupling mechanism 5 of the embodiment, an engagement groove 51*a* is formed on the outer circumference the column-shaped plug 51.

Figure 8:
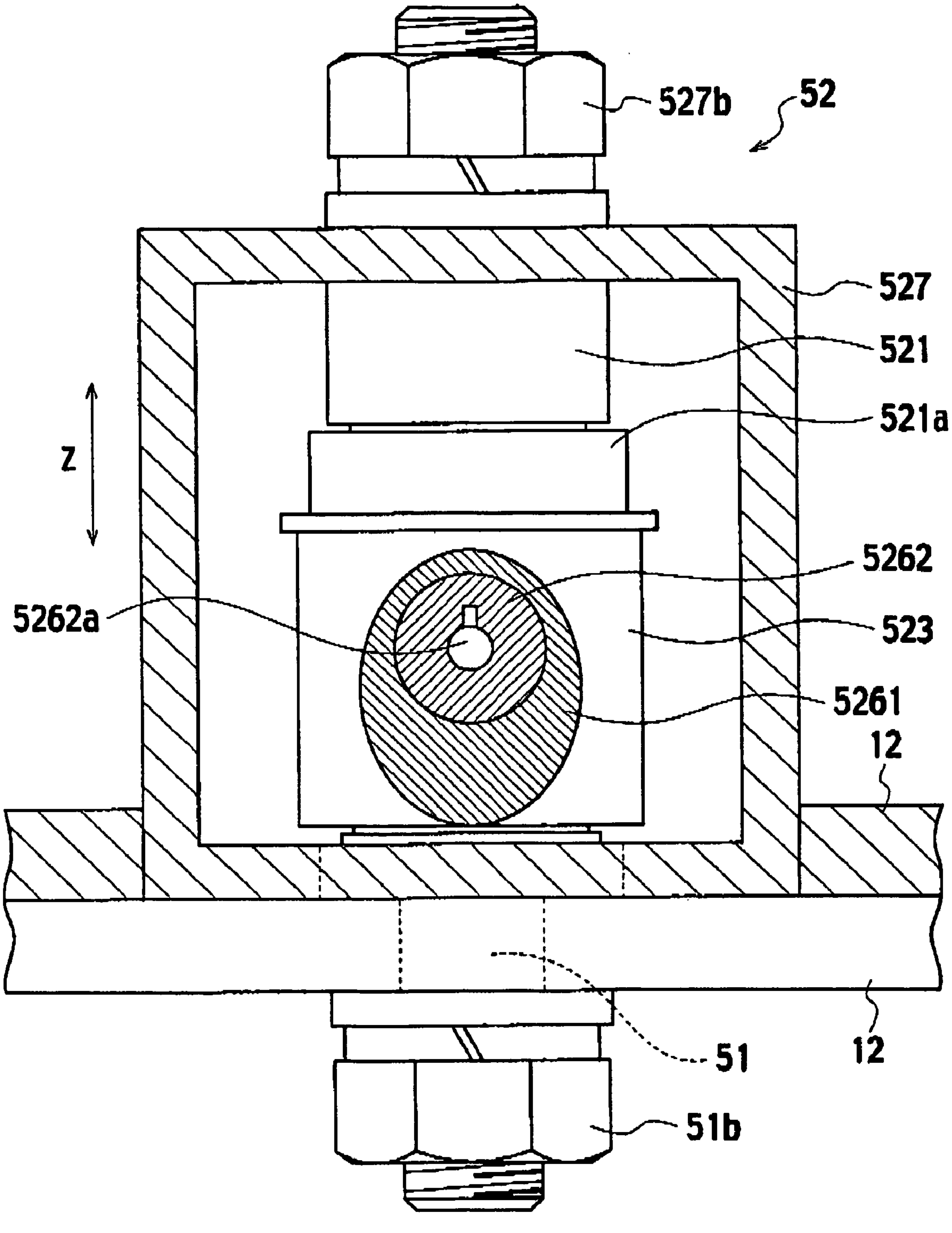
FIG. 8 is a sectional view of the substantial part of the plug receiver of FIG. 7, taken along a line 8-8 therein.

As shown in FIG. 8 and the following drawings, the plug receiver 52 includes a socket 521, slip-proof members 522 formed by rigid balls, a sliding cylinder (sleeve) 523 having a flange, first and second spring members 524, 525 and a cam mechanism 526. These elements forming a plug receiving mechanism are all accommodated in a casing 527 in the form of a box.

Figure 9:
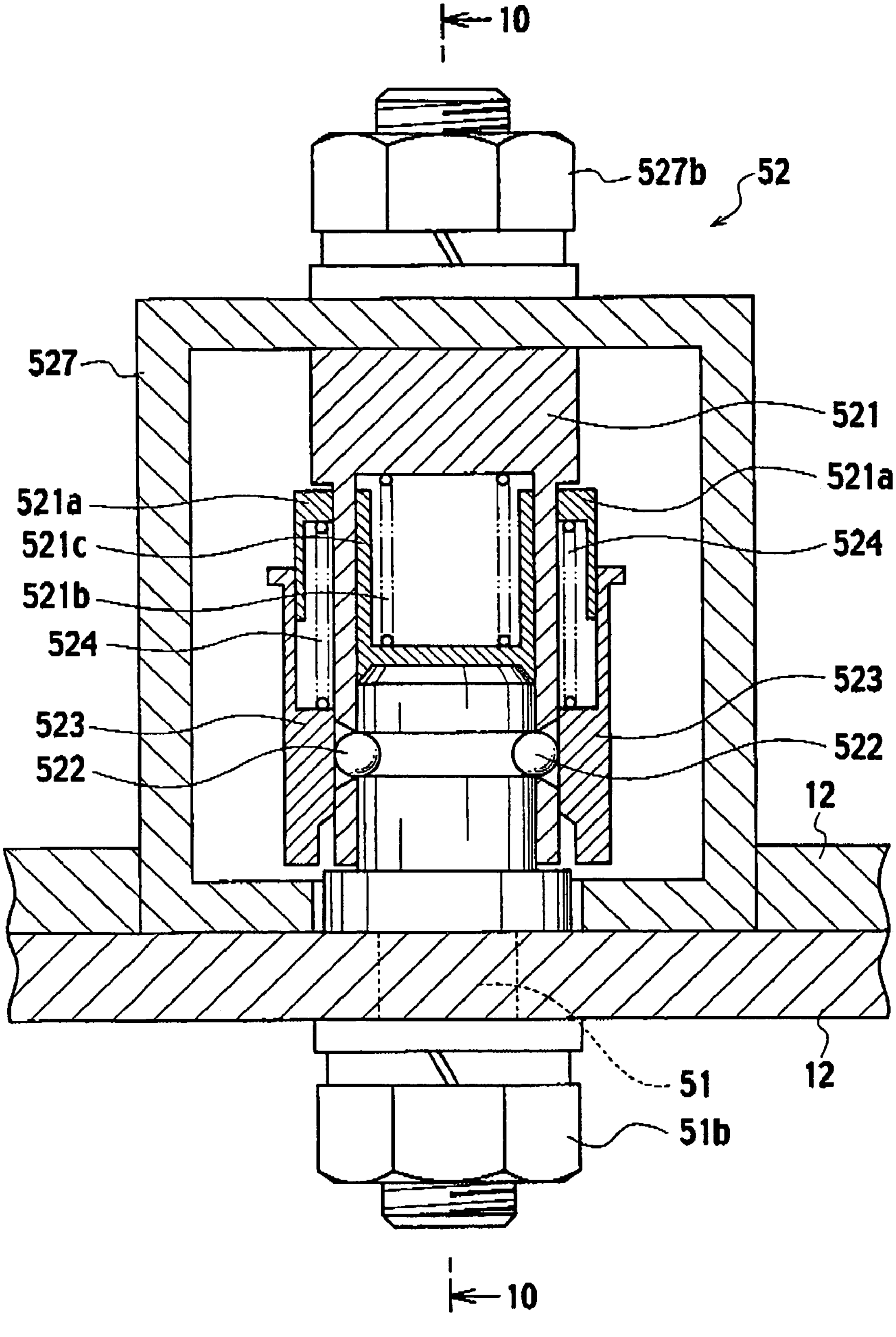
FIG. 9 is a sectional view of the substantial part of the plug receiver of FIG. 7, taken along a line 9-9 therein.
Figure 10:
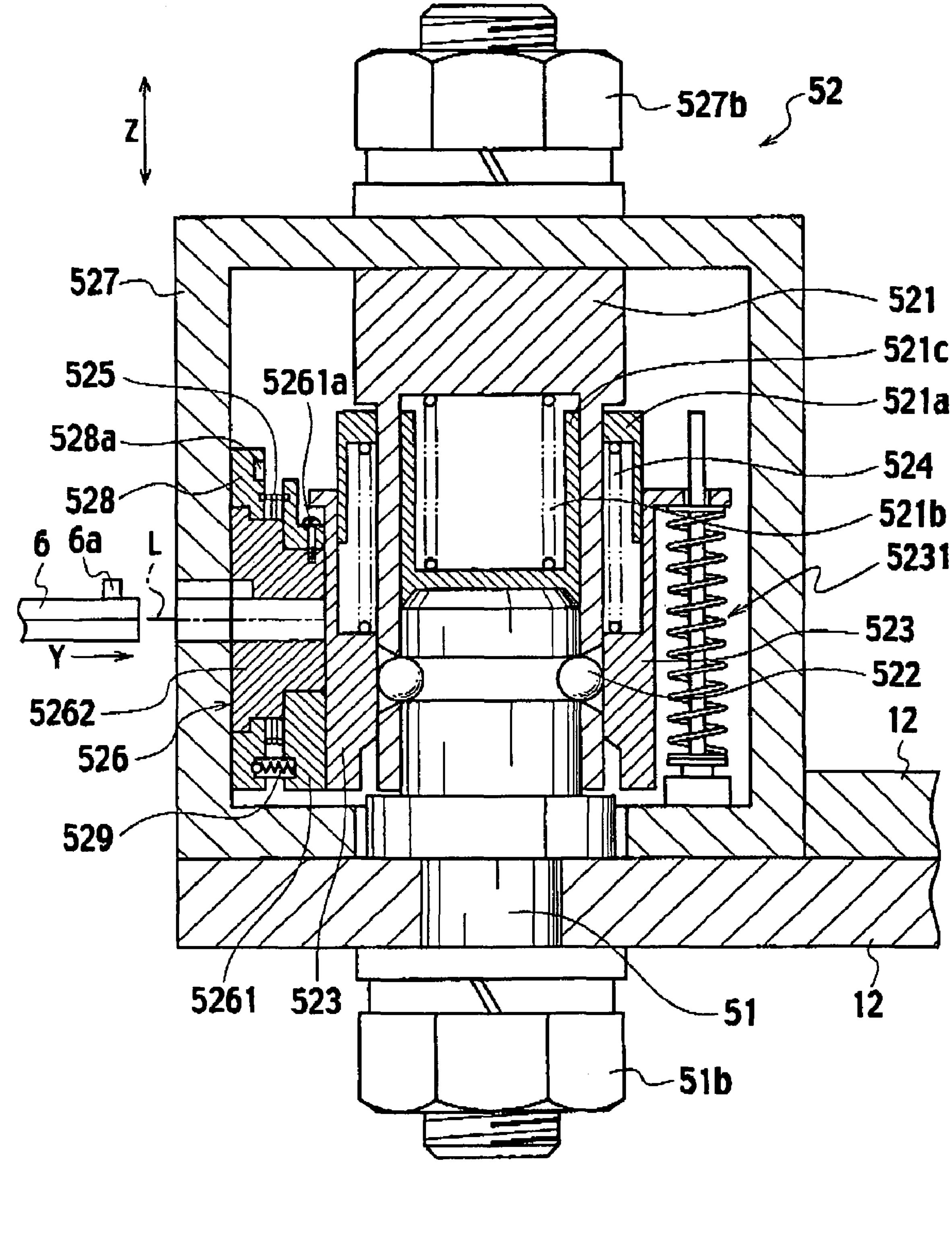
FIG. 10 is a sectional view of the substantial part of the plug receiver of FIG. 9, taken along a line 10-10 therein.

FIG. 8 is a sectional view of the substantial part of the coupling mechanism 5 consisting of the plug 51 and the plug receiver 52, taken along a line 8-8 of FIG. 7. FIG. 9 is a partial-cutaway sectional view of the substantial part of the coupling mechanism 5, taken along a line 9-9 of FIG. 7. FIG. 10 is a partial-cutaway sectional view of the substantial part of the coupling mechanism 5, taken along a line 10-10 of FIG. 9.

As shown in FIGS. 8 to 10, the socket 521 of the plug receiver 52 is shaped cylindrically in a manner that its movement to an axial direction of the plug 51 (i.e. a direction of arrow Z) allows it to be fitted in the socket 521.

As shown in FIGS. 9 and 10, the slip-proof members 522 are composed of a plurality of rigid balls arranged around the socket 521. In assembling, these balls are engaged in the engagement groove 51*a* of the plug 51, serving to prevent the plug 51 from slipping out of the socket 521.

The sliding cylinder 523 is adapted so as to be slidable outside the socket 521 coaxially in the axial direction of the plug 51. With the sliding of the sliding cylinder 523, the slip-proof members 522 are pushed into the engagement groove 51*a* of the plug 51, effecting the engagement between the groove 51*a* and the members 522.

The first spring member 524 is formed by a coil spring wound around the socket 521 and interposed between the socket 521 and the sliding cylinder 523. In the assembly, the first spring member 524 is arranged so as to always urge the sliding cylinder 523 in a direction to engage the slip-proof members 522 into the engagement groove 51*a*. Thus, the first spring member 524 is interposed between an engagement part 521*a* formed integrally with the socket 521 and the sliding cylinder 523, so that it is urged downwardly to push the slip-proof members 522.

As shown in FIG. 10, the second spring member 525 urges the cam mechanism 526, which is rotatable about a rotating axis L, to its rotating direction.

In detail, the cam mechanism 526 is constructed so as to be rotatable about the rotating axis L while being guided by a guide plate 528 secured on the casing 527. Around the rotating axis L of the cam mechanism 526, the second spring member 525 is interposed between the guide plate 528 secured on the casing 527 and a cam 5261 so that it can be stabilized at an angular position where the engagement between the slip-proof members 522 and the engagement groove 51*a* is maintained.

Accordingly, the second spring member 525 is assembled so as to urge the cam mechanism 526 by a spring force allowing the cam mechanism 526 to be stabilized at its rotating position shown in FIG. 10.

In this way, under a condition of FIG. 10, the cam 5261 of the cam mechanism 526 becomes stable in its position where the sliding cylinder 523 is not driven.

Figure 11:
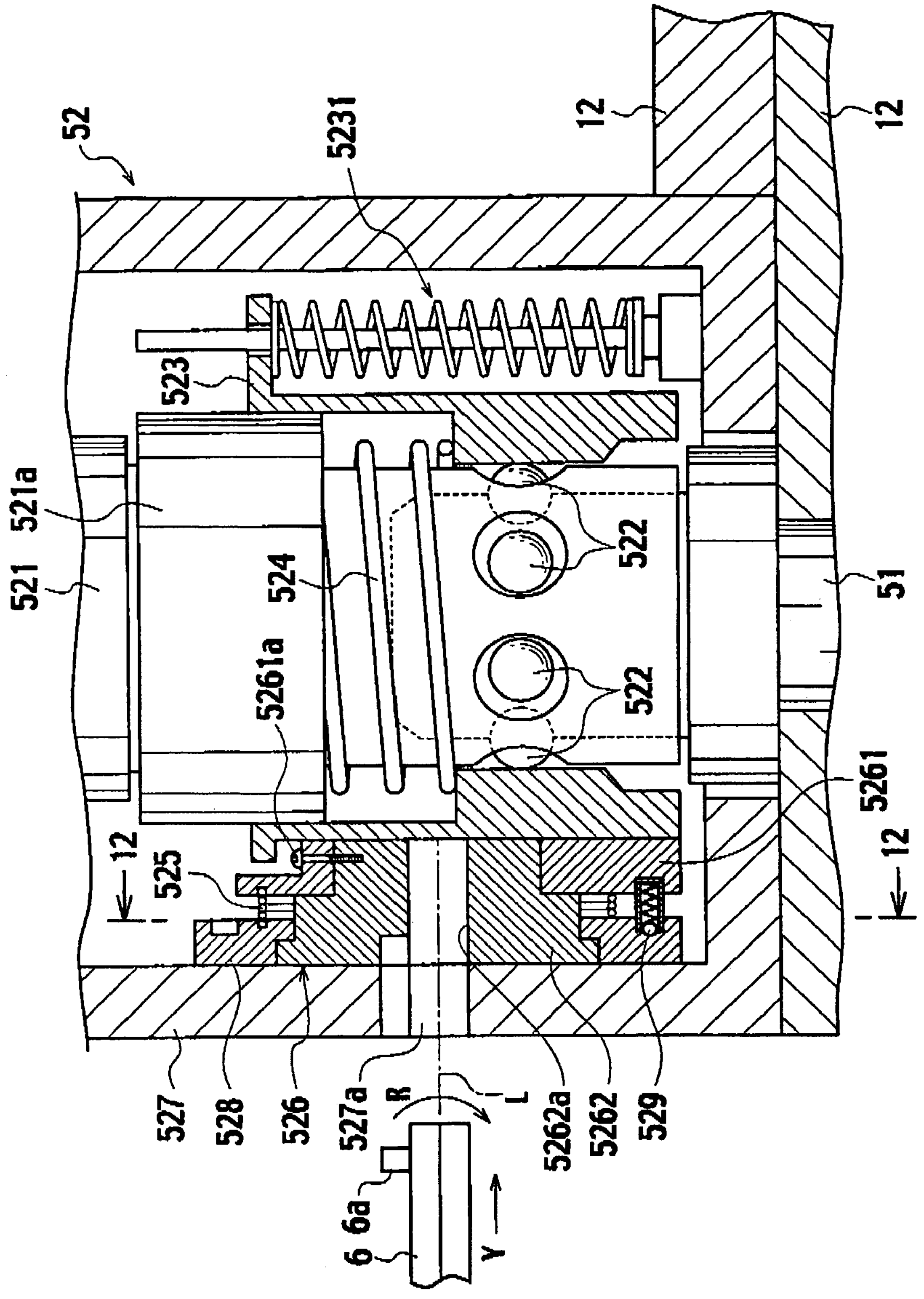
FIG. 11 is an enlarged view of the substantial part of the plug receiver of FIG. 10.

FIG. 11 is an enlarged view of the substantial part of the coupling mechanism shown in FIG. 10.

As shown in FIG. 11, the cam mechanism 526 includes the cam 5261 and a cam supporting plate 5262 fixed to the cam 5261 integrally through a screw 5261*a*. In operation, when rotating the cam supporting plate 5262 in a clockwise direction shown with arrow R, the cam 5261 is rotated to move the sliding cylinder 523 in opposition to the urging of the spring member 524, allowing the engagement between the slip-proof members 522 and the engagement groove 51*a* to be cancelled.

Thereat, as mentioned above, the cam 5261 is stabilized in its position not to drive (operate) the sliding cylinder 523 due to the action of the second spring member 525. Additionally, in order to ensure the stabilization furthermore, a notch mechanism 529 is interposed between the cam 5261 and the guide plate 528. The details of the notch mechanism 529 will be described later.

In order to manipulate the cam mechanism 526 in rotation, key holes 527*a*, 5262*a* having identical cross sections are formed in the casing 527 and the cam supporting plate 5262, respectively.

In order to allow an operator to rotate the cam 5261, a key tool 6 is provided with a projection 6*a*, having a cross section substantially identical to the sectional shapes of the key holes 527*a*, 5262*a*. In manipulation, an operator inserts the key tool 6 into the key hole 527*a* and the sequent key hole 5262*a* and further rotates the key tool 6 to rotate the cam 5261. With the operator's manipulation to rotate the cam 5261, the sliding cylinder 523 is elevated in opposition to the first spring member 524, so that the slip-proof members 522 are released from the engagement groove 51*a*, allowing the plug 51 to be disengaged from the plug receiver 52.

Now, we describe the above notch mechanism 529 assembled between the cam 5261 and the guide plate 528.

The notch mechanism 529 is provided to stabilize the cam mechanism 526 while the sliding cylinder 523 is pushing the slip-proof members 522 into the engagement groove 51*a* of the plug 51 for engagement.

Figure 12:
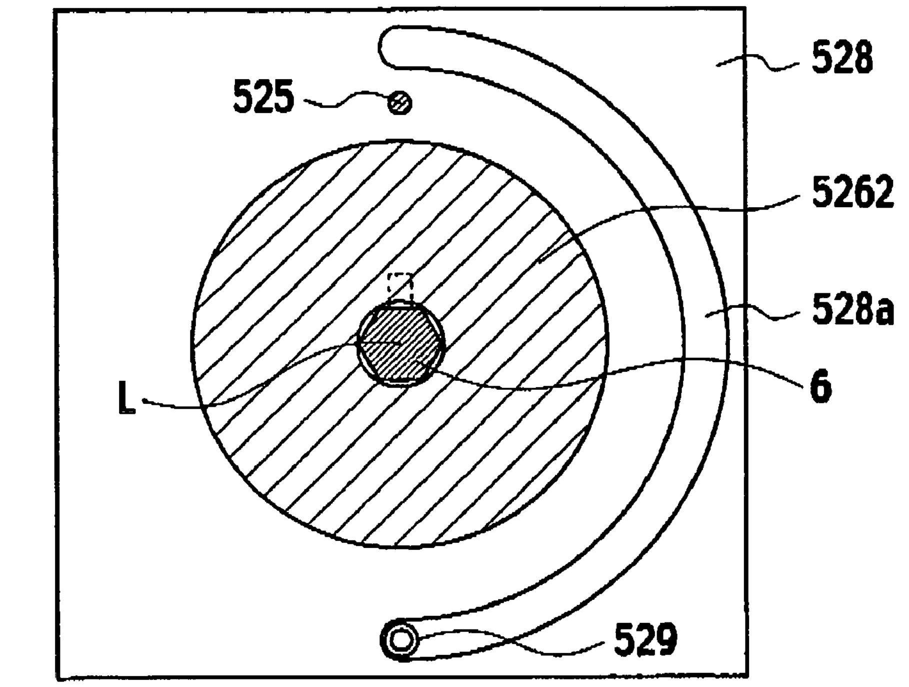
FIG. 12 is a sectional view of the substantial part of the plug receiver of FIG. 11, taken along a line 12-12 therein.
Figure 13:
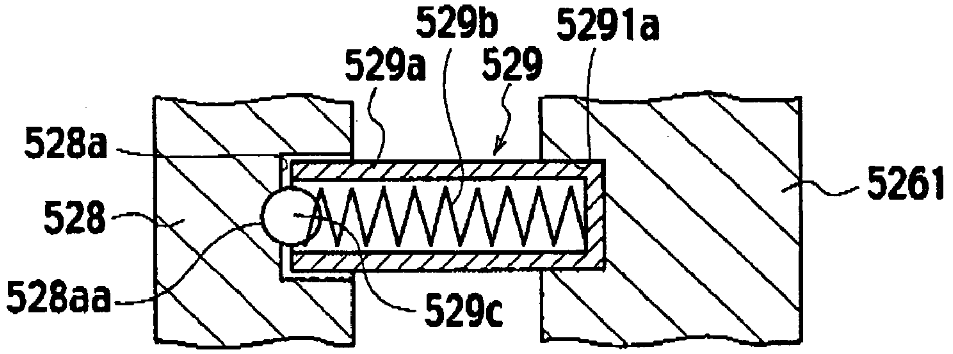
FIG. 13 is an enlarged view of the substantial part of a notch mechanism of FIG. 11.
Figure 14:
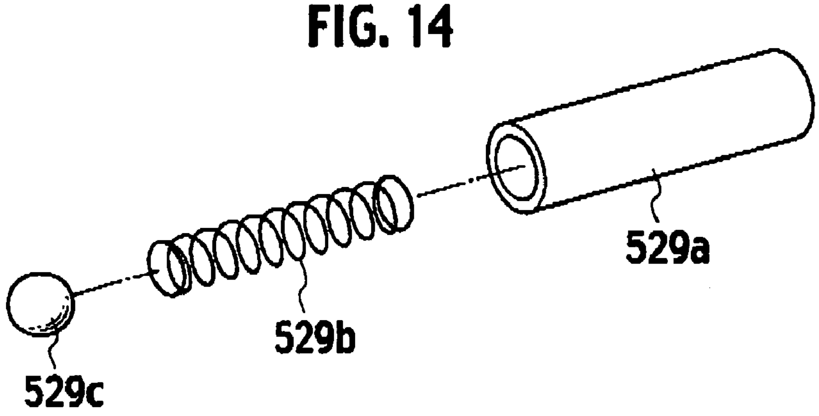
FIG. 14 is an exploded perspective view of the notch mechanism of FIG. 11.

FIG. 12 is a sectional view of the substantial part of FIG. 11, taken along a line 12-12. FIG. 13 is an enlarged view of the substantial part of the notch mechanism 529 of Fig, 11. FIG. 14 is an exploded perspective view of the notch mechanism 529 of FIG. 11.

As shown in FIGS. 13 and 14, the notch mechanism 529 includes a bottomed cylinder 529*a* whose bottom is fitted in a rotational surface of the cam 5261, a coil spring member 529*b* inserted into the bottomed cylinder 529*a* and a ball 529*c* urged by the coil spring member 529*b* and arranged so as to push out of an opening of the cylinder 529*a*.

The notch mechanism 529 rotates about the rotating axis L with the rotation of the cam 5261. For this purpose, as shown in FIGS. 12 and 13, a semicircular guide groove 528*a* is formed in the guide plate 528 in order to allow the ball 529*c* of the notch mechanism 529 to rotate smoothly and appropriately while describing an arc along the plane of the guide plate 528 without deviating from the arc.

As shown in FIGS. 11 and 13, the guide groove 528*a* is provided, at a lowermost position, with a recess 528*aa* for receiving the ball 529*c* partially.

Thus, as shown in FIGS. 11 and 12, if the notch mechanism 529 secured on the cam 5261 is just positioned at the recess

528*aa*, then the ball 529*c* is engaged in the recess 528*aa* gently, stabilizing the cam mechanism 526.

Note, in the structure of FIGS. 7 to 11, the plug 51 is fixed on the casing 12 of the display unit 1 by a bolt 51*b*, while the socket 521 of the plug receiver 52 is fixed on the casing 527 by a bolt 527*b*. Also, the casing 527 is secured on an opening at the bottom of the display unit 1 by means of welding or the like.

In order to smoothen the coupling operation between the socket 521 and the plug 51, as shown in FIGS. 9 and 10, a pusher cylinder 521*c* urged by a coil spring 521*b* is movably fitted into the bottom part of the socket 521.

Further, in order to smoothen the movement of the sliding cylinder 523 during the rotational manipulation of the cam 5261, a coil spring mechanism 5231 is accessorily arranged on the opposite side of the cam mechanism 526 and between the sliding cylinder 523 having the flange and the casing 527, as shown in FIGS. 10 and 11.

Figure 15:
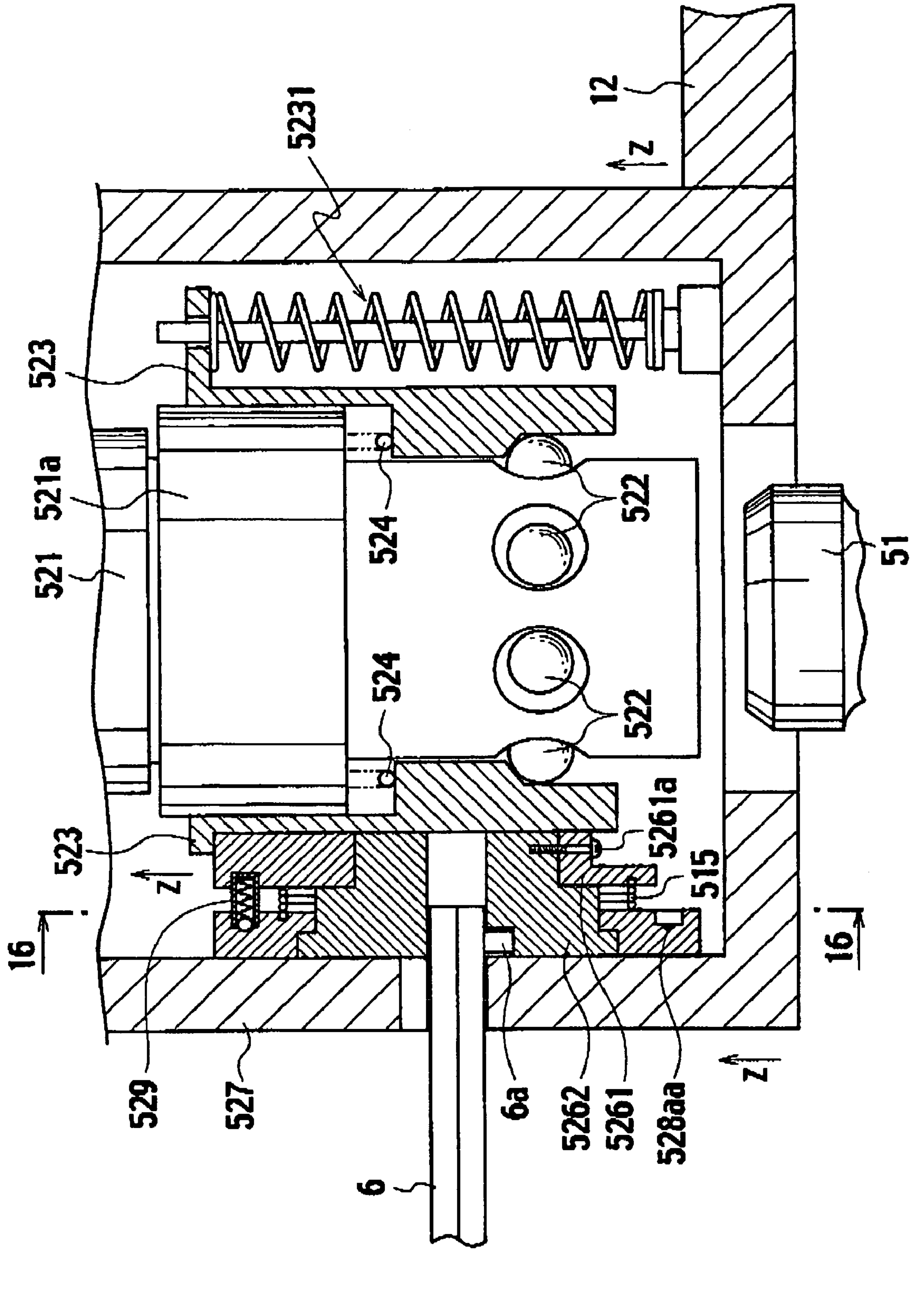
FIG. 15 is an enlarged view of the substantial part of the plug receiver of FIG. 11, showing a state where a cam mechanism is rotated.
Figure 16:
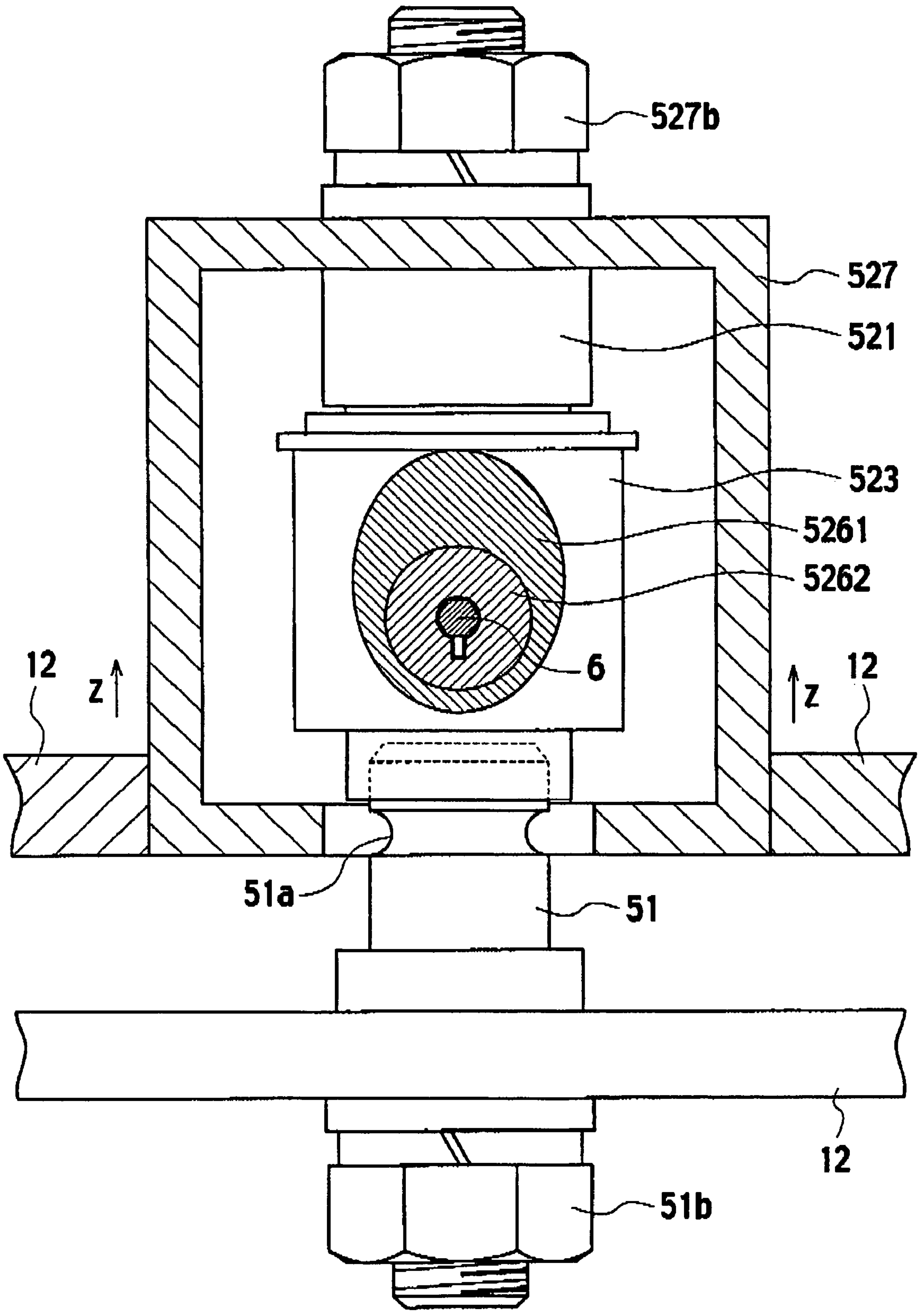
FIG. 16 is a sectional view of the plug receiver of FIG. 15, taken along a line 16-16 therein.
Figure 17:
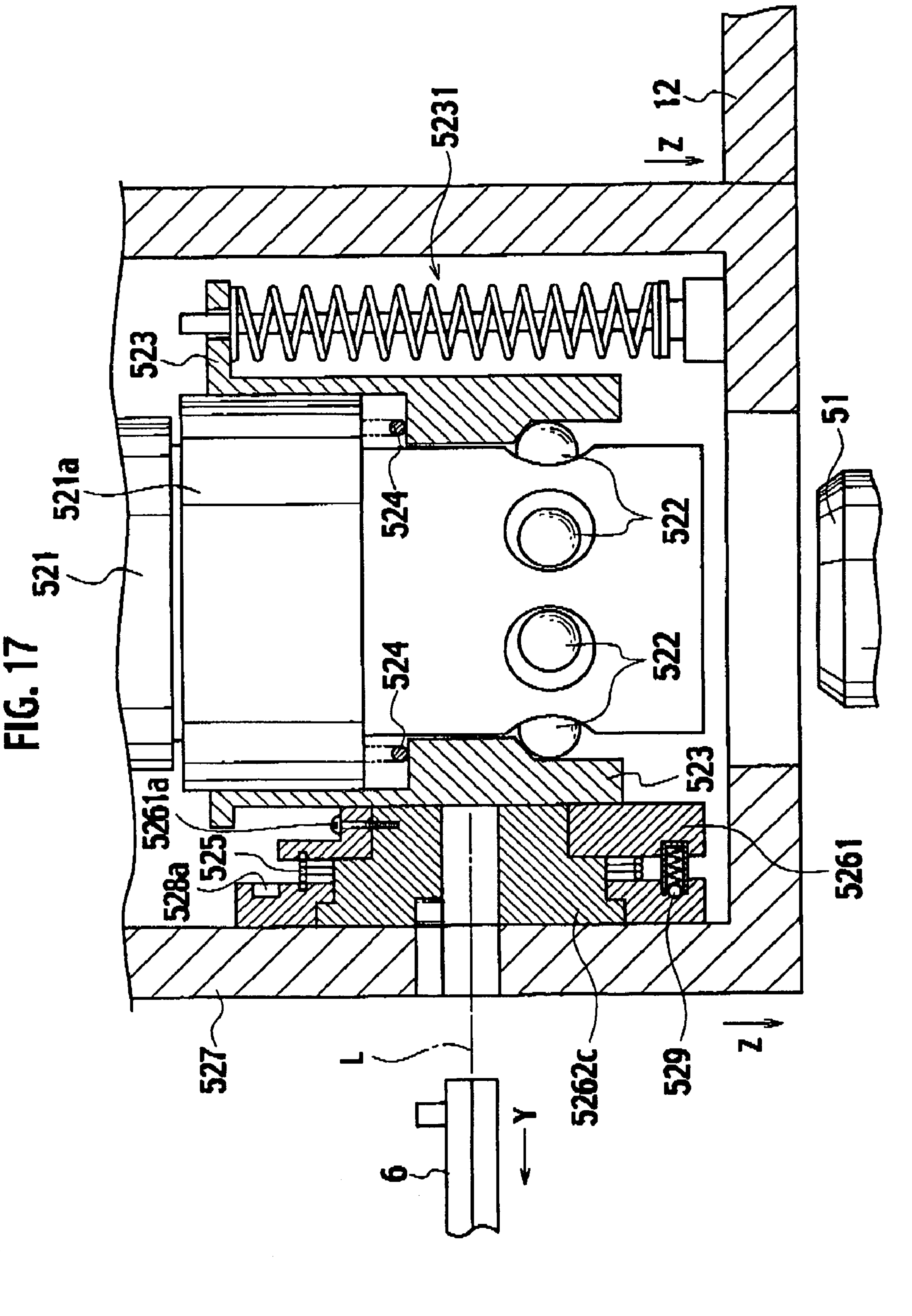
FIG. 17 is an enlarged view of the substantial part of the plug receiver of FIG. 11, showing a state where the cam mechanism is rotated.

With reference to FIGS. 15 to 17 in addition to FIG. 11, the procedures of connection/disconnection between the upper and lower display units 1, 1 with the use of the above-constructed coupling mechanism 5 will be described below.

In the state shown in FIG. 11, with the aid of the notch mechanism 529, the coupling mechanism 5 is stabilized under condition that the plug 51 of the lower display unit 1 is fitted into the plug receiver 52 of the upper display unit 1.

From the state of FIG. 11, the key tool 6 is inserted into the key hole 5262*a* of the cam mechanism 526 along the direction Y and subsequently, the cam 5261 is rotated in the clockwise direction (i.e. the direction R) in opposition to the spring force of the second spring member 525.

With the rotation of the eccentric cam 5261 in the clockwise direction by 180 degrees with the use of the key tool 6, the sliding cylinder 523 is pushed upwardly (i.e. a direction shown with arrow Z of FIG. 15) as shown in FIG. 16 illustrating a section of the substantial part taken along a line 16-16 of FIG. 11, so that the pushing operation of the sliding cylinder 523 against the slip-proof members 522 is cancelled.

That is, by drawing up the upper display unit 1 in the direction Z, the plug receiver 52 can be detached from the plug 51.

Under such a state, since the key tool 6 is positioned so that the projection 6*a* directs upwardly as shown in FIG. 15, an operator cannot pull out the tool 6 from the casing 527.

Further, as the plug 51 is pulled put from the plug receiver 52, the pusher cylinder 521*c* urged by the coil spring 521*b* moves downwardly at a position where the outer periphery of the pusher cylinder 521*c* is opposite to the slip-proof members 522, so that the slip-proof members 522 are inhibited from moving inwardly in the radial direction.

Next, when rotating the key tool 6 in the counter-clockwise direction by 180 degrees, the cam 5261 returns to its original position (i.e. the position shown in FIG. 11) and is stabilized, as shown in FIG. 17. At this time, since the slip-proof members 522 are prohibited from moving inwardly by the pusher cylinder 521*c*, the sliding cylinder 523 is held at a position where the sliding cylinder 523 is moved upwardly.

Thus, as shown in FIG. 17, under condition of drawing out the key tool 6 in the direction Y, the plug receiver 52 is brought into a condition where the plug 51 can be engaged with the plug receiver 52 through one-touch operation.

As mentioned above, according to the coupling mechanism 5 composed of the above-constructed plug 51 and the plug receiver 52, the connecting/disconnecting operation (as occasion demands) can be accomplished with the simple constitution easily and appropriately.

In the image display device where a plurality of display units 1, 1 each provided, at its upper and lower ends, with the above-mentioned coupling mechanisms in pairs are connected with each other vertically, if only aligning the plug receiver of the upper display unit with the plug of the lower display unit and further superimposing them on each other, the upper and lower display units can be connected with each other easily and appropriately without requiring any special guide pin. Consequently, it is possible to realize the efficiency of assembling the image display device.

The above-mentioned embodiment may be modified to various forms.

For example, the column-shaped plug 51 in the above-mentioned embodiment may be modified to have any other configuration (e.g. square column) that allows the plug 51 to be connected to the socket 521 of the plug receiver 52. Then, the shapes of the plug 521 and the sliding cylinder 523 would be modified corresponding to the shape of the modified plug 51.

Additionally, it is noted that the above-mentioned embodiment adopts the second spring member 525 and the notch mechanism 529 in order to prevent rotational deviation of the cam mechanism 526 due to vibrations and also ensure an operator's manipulation of the key tool 6 for the cam mechanism 526. In the modification, in place of the provision of the second spring member 525, the guide plate 528 may be provided, in the groove 528*a*, with a pair of diametrical opposite recesses 528*aa* for stabilizing the cam mechanism 526 in its upper and lower rotational positions at 180 degrees with each other.

Note, according to the coupling mechanism of the above-mentioned embodiment, since the connection between the display units 1, 1 in vertical arrangement can be cancelled by only manipulating the key tool 6, it is possible to prevent the connected display units 1, 1 from being disconnected from each other by mischief etc. Additionally, since the plug 51 and the plug receiver 52 are always brought into mutually-connectable condition when the key tool 6 is not inserted into the key hole, an operator can perform such a connecting operation unmistakably.

Finally, it will be understood by those skilled in the art that the foregoing descriptions are mere embodiments and various modifications of the disclosed coupling mechanism and the discloses image display device and therefore, various changes and modifications may be made within the scope of claims.

What is claimed is:

1. A coupling mechanism, comprising:

a column-shaped plug having an engagement groove formed on an outer circumference thereof;

a cylindrical socket adapted so as to be movable to and from the plug in an axial direction thereof and formed so as to be engageable with the plug;

at least one slip-proof member attached to the socket and formed so as to be engageable in the engagement groove of the plug;

a sliding cylinder fitted around the socket so as to be slidable in the axial direction of the plug and formed so as to push the slip-proof member into the engagement groove of the plug;

a first spring member for urging the sliding cylinder in a direction to push the slip-proof member into the engagement groove of the plug;

a cam mechanism equipped with a cam so that a rotation of the cam allows the sliding cylinder to move in opposition to urging of the first spring member thereby canceling an engagement between the slip-proof member and the engagement groove; and a second spring member for urging the cam to a position where the engagement between the slip-proof member and the engagement groove is maintained.

2. The coupling mechanism as claimed in claim 1, wherein the slip-proof member is formed by a rigid ball.

3. A coupling mechanism, comprising:

a column-shaped plug having an engagement groove formed on an outer circumference thereof;

a cylindrical socket adapted so as to be movable to and from the plug in an axial direction thereof and formed so as to be engageable with the plug;

at least one slip-proof member attached to the socket and formed so as to be engageable in the engagement groove of the plug;

a sliding cylinder fitted around the socket so as to be slidable in the axial direction of the plug and formed so as to push the slip-proof member into the engagement groove of the plug;

a first spring member for urging the sliding cylinder in a direction to push the slip-proof member into the engagement groove of the plug;

a cam mechanism equipped with a cam so that a rotation of the cam allows the sliding cylinder to move in opposition to urging of the first spring member thereby canceling an engagement between the slip-proof member and the engagement groove; and a notch mechanism for stabilizing the cam in its rotating angular position where the engagement between the slip-proof member and the engagement groove is maintained.

4. A coupling mechanism, comprising:

a column-shaped plug having an engagement groove formed on an outer circumference thereof;

a cylindrical socket adapted so as to be movable to and from the plug in an axial direction thereof and formed so as to be engageable with the plug;

at least one slip-proof member attached to the socket and formed so as to be engageable in the engagement groove of the plug;

a sliding cylinder fitted around the socket so as to be slidable in the axial direction of the plug and formed so as to push the slip-proof member into the engagement groove of the plug;

a first spring member for urging the sliding cylinder in a direction to push the slip-proof member into the engagement groove of the plug;

a cam mechanism equipped with a cam so that a rotation of the cam allows the sliding cylinder to move in opposition to urging of the first spring member thereby canceling an engagement between the slip-proof member and the engagement groove; and a tool detachably attached to the cam mechanism to enable the cam to rotate about a rotating axis thereof.

5. The coupling mechanism as claimed in claim 4, wherein:

the cam mechanism has a key hole formed in the rotating axis; and the tool is configured so as to enable the slip-proof member to be disengaged from the engagement groove by inserting the tool into the key hole and sequent rotating therein.

6. An image display device, comprising:

at least two display units each having a number of display elements; and a coupling tool for connecting the display units with each other vertically, the coupling tool including:

a coupling mechanism comprising a column-shaped plug having an engagement groove formed on an outer circumference thereof;

a cylindrical socket adapted so as to be movable to and from the plug in an axial direction thereof and formed so as to be engageable with the plug;

at least one slip-proof member attached to the socket and formed so as to be engageable in the engagement groove of the plug;

a sliding cylinder fitted around the socket so as to be slidable in the axial direction of the plug and formed so as to push the slip-proof member into the engagement groove of the plug;

a first spring member for urging the sliding cylinder in a direction to push the slip-proof member into the engagement groove of the plug;

a cam mechanism equipped with a cam so that a rotation of the cam allows the sliding cylinder to move in opposition to urging of the first spring member thereby canceling an engagement between the slip-proof member and the engagement groove; and a second spring member for urging the cam to a position where the engagement between the slip-proof member and the engagement groove is maintained.

7. The image display device as claimed in claim 6, wherein:

the plug is arranged at each upper end of the display units; and the socket is arranged at each lower end of the display units.

8. The image display device as claimed in claim 6, wherein:

each of the display elements comprises a light emitting diode.

* * * * *